US012744938B2

(12) United States Patent
Kalva et al.

(10) Patent No.: US 12,744,938 B2
(45) Date of Patent: Sep. 22, 2026

(54) SYSTEMS AND METHODS FOR SIGNAL CODING AND DECODING WITH ENTROPY-MINIMIZING KERNEL-BASED TRANSFORMATION

(71) Applicant: OP Solutions LLC, Amherst, MA (US)

(72) Inventors: Hari Kalva, Boca Raton, FL (US); Borivoje Furht, Boca Raton, FL (US); Velibor Adzic, Canton, GA (US)

(73) Assignee: OP Solutions LLC, Amherst, MA (US)

( * ) Notice: Subject to any disclaimer, the term of this patent is extended or adjusted under 35 U.S.C. 154(b) by 0 days.

(21) Appl. No.: 18/936,223

(22) Filed: Nov. 4, 2024

(65) Prior Publication Data

US 2025/0063198 A1 Feb. 20, 2025

Related U.S. Application Data

(63) Continuation of application No. PCT/US2023/022309, filed on May 16, 2023.

(60) Provisional application No. 63/342,789, filed on May 17, 2022.

(51) Int. Cl.
*H04N 19/60* (2014.01)
*H04N 19/136* (2014.01)

(52) U.S. Cl.
CPC .......... *H04N 19/60* (2014.11); *H04N 19/136* (2014.11)

(58) Field of Classification Search
CPC ............................ H04N 19/60; H04N 19/136
See application file for complete search history.

(56) References Cited

U.S. PATENT DOCUMENTS

2020/0296356 A1* 9/2020 Mora ........................ G06T 7/90

* cited by examiner

*Primary Examiner* — On S Mung
(74) *Attorney, Agent, or Firm* — OP Solutions IP Department; Paul Ackerman

(57) ABSTRACT

A system for coding and decoding of signals, such as pictures and video, intended for machine use is disclosed. An encoder implements a method for kernel-based transformation of the signal samples that reduces and preferably minimizes entropy of the input signal yet is equivalent to the input signal for the intended machine operation. As a result, the transformed signal sample can be compressed using fewer bits than the original. The encoded signal is received by a complimentary decoder and decoded for machine use.

13 Claims, 7 Drawing Sheets

| 1 | 0 | -1 |
|---|---|---|
| 2 | 0 | -2 |
| 1 | 0 | -1 |

Sobel x and y kernels

| 1 | 2 | 1 |
|---|---|---|
| 0 | 0 | 0 |
| -1 | -2 | -1 |

Sobel x and y kernels

| 1 | 0 | 1 |
|---|---|---|
| 0 | 1 | 0 |
| 1 | 0 | 1 |

3x3 Convolution kernels

| 1 | 1 | 1 |
|---|---|---|
| 1 | 1 | 1 |
| 1 | 1 | 1 |

3x3 Convolution kernels

| 1 | 0 | 0 |
|---|---|---|
| 0 | 1 | 0 |
| 0 | 0 | 1 |

3x3 Convolution kernels

| 0 | 0 | 1 |
|---|---|---|
| 0 | 1 | 0 |
| 1 | 0 | 0 |

3x3 Convolution kernels

| 1 | 0 | -1 | -2 | 0 | 2 | 1 | 0 | -1 |
|---|---|---|---|---|---|---|---|---|

Unrolled to vector 1x9 Sobel X

| 1 | 2 | 1 | 0 | 0 | 0 | -1 | -2 | -1 |
|---|---|---|---|---|---|---|---|---|

Unrolled 1x9 Sobel Y

| 1 | 0 | -1 | -2 | 0 | 2 | 1 | 0 | -1 |
|---|---|---|---|---|---|---|---|---|
| 1 | 2 | 1 | 0 | 0 | 0 | -1 | -2 | -1 |

Stacked 2x9 Sobel Matrix (K)

| | | |
|---|---|---|
| 92 | 91 | 86 |
| 108 | 111 | 104 |
| 136 | 133 | 132 |
Original 3x3 sample
FIG. 6A
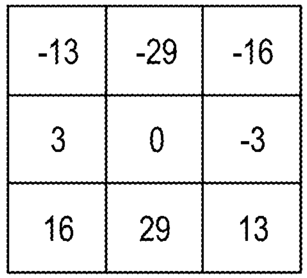
| | | |
|---|---|---|
| -13 | -29 | -16 |
| 3 | 0 | -3 |
| 16 | 29 | 13 |
Transformed Sobel
FIG. 6B
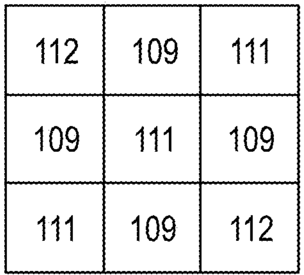
| | | |
|---|---|---|
| 112 | 109 | 111 |
| 109 | 111 | 109 |
| 111 | 109 | 112 |
Transformed Conv
FIG. 6C
| |
|---|
| 92 |
| 91 |
| 86 |
| 104 |
| 111 |
| 108 |
| 136 |
| 133 |
| 132 |
FIG. 7

SYSTEMS AND METHODS FOR SIGNAL CODING AND DECODING WITH ENTROPY-MINIMIZING KERNEL-BASED TRANSFORMATION

CROSS-REFERENCE TO RELATED APPLICATIONS

The present application is a continuation of PCT/US2023/022309, filed on May 16, 2023, and titled SYSTEMS AND METHODS FOR SIGNAL CODING AND DECODING WITH ENTROPY-MINIMIZING KERNEL-BASED TRANSFORMATION, which application claims the benefit of priority to U.S. Provisional Application Ser. No. 63/342,789 filed on May 17, 2022, and entitled "Systems and Methods for Picture and Video Coding with Entropy-minimizing Kernel-based Transformation," the disclosure of which is hereby incorporated by reference in its entirety.

BACKGROUND OF THE DISCLOSURE

Signals of various modalities are used to transmit information from data sources, such as sensors to remote receivers. Examples are visual signals recorded by cameras, audio signals recorded by microphones, and in general, signals recorded by devices and transmitted to end users. As Internet of Things (IoT) technology advances, the range of such devices increases. On the receiver side, the end users can be human or automated systems implemented by machines. Various coding techniques are used to transmit the signals from the sensors to the receivers in an optimized manner. To select the appropriate coding technique, one can consider the characteristics of the communication channel (such as bandwidth), energy consumption constraints (such as battery state), receiver fidelity criteria (such as quality of the received signal), etc.

Recently, the type of the end user at the receiving end has been shifting from primarily human to machine use. Proliferation of edge devices, and more supportive communication networks, such as 5G and 6G, allow for broader implementation of systems such as Internet-of-Things, and in general, autonomous systems. Some of the areas such as image and video coding have increased demand for systems that support automated analysis of signals by the machines at the receiver end, as reflected in the standardization efforts such as Video Coding for Machines and JPEG AI.

One of the drawbacks of current coding techniques, particularly in the image, video and audio modality, is that the coding algorithms are typically designed for human consumption. For example, the visual signal is quantized such that the higher frequencies are discarded since, in a simplified description, the human visual system does not process signals outside of the narrow frequency band. Similar processing is typically done for audio signals. However, the processing techniques implemented for machines differ from the simplified processing techniques associated with the human brain. Most of the machine processing techniques include transforming the coded signal samples by linear operations implemented using filters which are also called kernels.

The goal of such operations is to transform the coded signal samples from the original linear space, such as the image space, into a linear space that is suitable for the task completion by the machines. One such example is transformation of the input pictures by the neural networks into higher-dimensional spaces and finally into low dimensional decision space. For example, an input picture is transformed from the pixel space into higher-dimensional manifold in which a neural network is able to find separation boundary between different types of objects, which results in the output vector that identifies a class or classes of the objects that are present in the picture.

SUMMARY OF THE DISCLOSURE

An encoder for signal coding with entropy-minimizing kernel-based transformation that is well suited for encoding signals for machine use includes a transformer module and a compressor module. The transformer module applies a set of transform kernels for a given machine task and determines a transformed equivalent of the input signal featuring reduced entropy. The compressor module receives the transformed signal and generates a compressed bitstream for transmission on a communication channel.

In some embodiments, the transform kernels are m×m matrices. The process of determining a transformed equivalent of the input signal can further include the operations of unrolling each m×m transform matrix into a one-dimensional vector and stacking the transform vectors into a single transform matrix. The input signal can be partitioned into m×m signal patches and each each m×m signal patch can be unrolled into a one-dimensional signal vector. Using the transform matrix, the transformer module determines a resultant vector, r, for each signal vector and for each resultant vector, determines the transformed signal as $t=K^T(KK^T)^{-1}r$ where $K^T$ is the transpose of the transform matrix.

In some applications, the signal is video. The kernels will typically depend, at least in part, on a machine model for the machine task which can be supplied to the transformer locally or remotely. Kernels may include, for example, a set of Sobel operators or convolution matrices.

The compressor will compress the transformed signal using a compression algorithm which may take the form of a known compression standard such as VVC, HEVC, AV1 and the like. The compressed signal will be received by a compliant decoder which can decode the transformed signal and provide it to a machine. The present methods are also suitable for hybrid applications in which the compressed bitstream includes the transformed signal for machine use as well as the original signal for human use.

BRIEF DESCRIPTION OF THE FIGURES

FIGS. 6A-C are pictures illustrating examples of a 3×3 image patch sample matrix and corresponding matrices transformed with Sobel and convolution samples, respectively;

FIG. 7 illustrates a 3×3 image patch "unrolled" into a 9×1 image vector;

DETAILED DESCRIPTION

Figure 1:
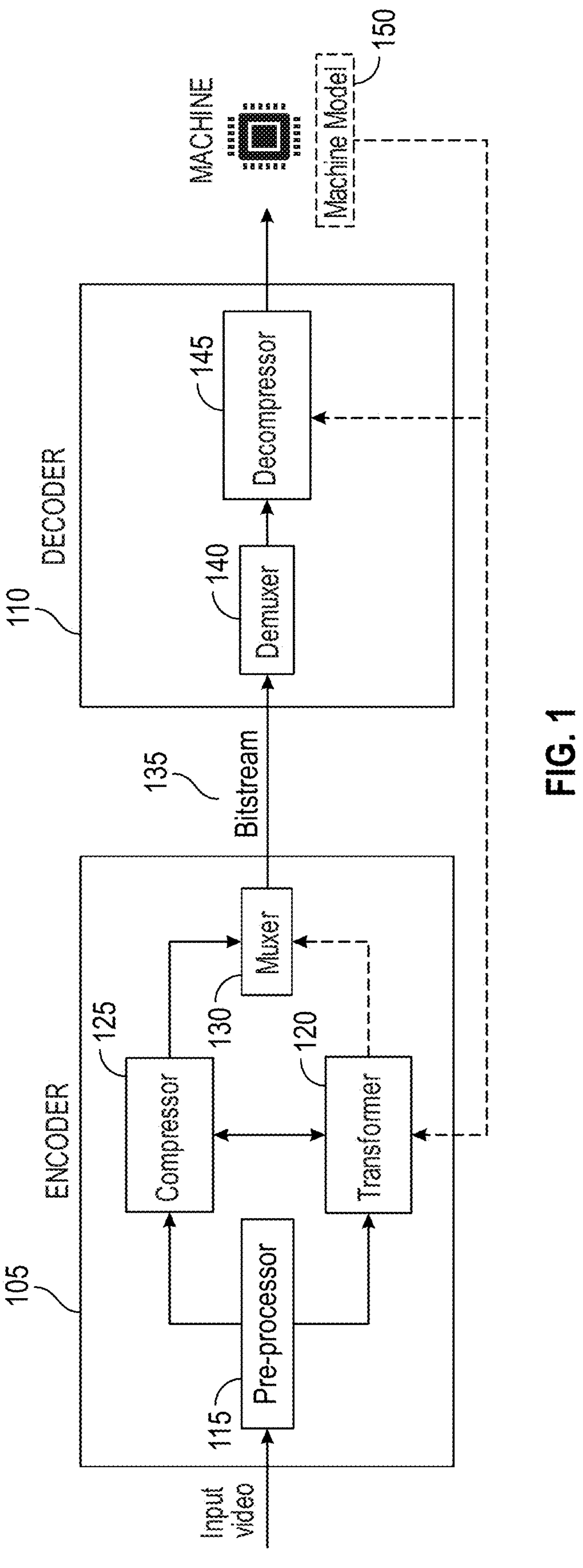
FIG. 1 is a simplified block diagram of a system including and encoder and decoder.

An exemplary system comprised of an encoder 105 and a decoder 110 is depicted in FIG. 1. An input data stream, such as a picture or a video is taken as input to the encoder and is applied to a pre-processor 115, which converts input picture/video into a format that is suitable for machine consumption, for example converting the color space, reducing the framerate, rescaling the resolution, etc. While video is described as a primary application, it will be appreciated that other input data streams, such as audio, radar, lidar, machine sensor data and the like can also be processed using the present methods. The output of the pre-processor 115 is passed to the transformer unit 120, and optionally to the compressor unit 125 as well.

Transformer unit 120 receives the converted picture/video data and applies sample-level transformation, which is described in more detail herein. Transformation is based on the kernel that a machine uses to process the pictures/videos and can be stored at the encoder or signaled by the machine model component using communication channel.

Compressor unit 125 receives the transformed samples of the picture/video and encodes them further using statistical coding or higher-level coding standard for picture and video coding. This process can be performed, for example, using any number of known compression standards such as HEVC, VVC, AV1 and the like and developing standards optimized for video coding for machine use, such a Video Coding for Machines and JPEG AI, as examples. In addition to the transformed samples, in some embodiments compressor 125 can receive as input the converted picture/video and encode the difference between the converted picture/video and the transformed samples. This allows the decoder 110 to reconstruct the transformed representation of the input picture/video as well as the converted picture/video in the pixel domain representation.

The transformer 120 and compressor 125 are preferably interconnected with a two-way communication link which is used to further optimize compression. For example, in some cases, the compressor 125 may better compress transformations that are not optimal in the entropy-minimization sense, but because of the compressor's 125 design are better suited for compression. The transformer 120 in such a case may send to the compressor 125 alternative transformation that results in better compression. The best transformation compression-wise can be found by using a search of the transformation variants, or by utilizing standard optimization techniques such as genetic algorithms. Output of the compressor 125 is provided to the multiplexer (muxer) 130.

Muxer 130 takes the output of the compressor 125 and converts it into a bitstream that is sent to the decoder 110. Muxer 130 can add metadata to the bitstream that describes the transformation parameters and additional information about the machine task, kernels, etc. Alternatively, the output of the transformer 120 can be sent directly to the muxer 130, thus circumventing the compressor 125. This approach can be useful in various use cases, such as when the encoder 105 is implemented on a device with constrained computational capabilities, or restricted power usage, or in the cases when the device that implements encoder 105 is in the reduced-operation regime. The computational complexity of such encoder 105 is greatly reduced at the expense of the uncompressed bitstream.

The bitstream 135 which contains the compressed pictures/video as a payload data, and the associated metadata, is sent to the decoder 110 which takes it as an input and processes it through the following components:

Demuxer 140 takes the bitstream 135 and demultiplexes (demuxes) it into components that can be read/parsed by the decompressor 145.

Decompressor 145 takes the payload data and the metadata and reconstructs the picture/video using the sequence of operations that are inverse operations to the encoder 105 operations. For example, if a VVC compliant encoder was used to encode the bitstream a VVC compliant decoder would be used to decode the bitstream. Decompressor 145 can be implemented as a simple statistical decoder, or a more sophisticated picture/video decoder in compliance with coding standards. Decompressor 145 can also take an input from the machine model 150 that indicates which pictures or parts of the video should be reconstructed based on the metadata and the current machine state. In the case of a scalable, layered bitstream, the decompressor 145 preferably first reconstructs the base layer that represents compressed transformed samples and subsequently or concurrently adds the residual information needed to reconstruct the pixel-domain representation. Pixel-domain representation can be used by another machine, or by the current machine for the separate task. It can also be used by the human end user.

In addition to the encoder 105 and the decoder 110, the system may also include one or more machine models 150 which can be used to update the transformer 120 and the decompressor 145. This may be achieved by sending information that can be used to update kernel parameters and task-related parameters relevant to the current machine state.

Transformation Method

The transformer 120 operates to transform an image from the pixel space, typically used by a human consumer, to a linear space that is suitable for a particular machine task and preferably exhibits minimum entropy. The image is generally processed in small sections of pixels referred to as image patches, which are transformed by the application of a suitable kernel and matrix operations to obtain an equivalent transformed representation having minimum entropy.

A two-dimensional input signal (e.g., image or video frame, or an arbitrary part of an image or a video frame) can be represented as a one-dimensional vector s, arranging samples (e.g., pixel values) into an array by scanning the samples in some sequential order.

To process the input signal, a computer vision, signal processing, machine learning, or any similar algorithm uses so-called kernels or filters-multiplying or convolving the input signal with the kernel to produce a result that represents transformed input signal in the more appropriate and more useful space which can be of a same or different dimension as the input signal.

In many cases, the input signal s is multiplied by more than one kernel. Here, one-dimensional kernels k are arranged into a two-dimensional matrix K, for example. The result of processing input signal s with the kernels K is one-dimensional output r. This result can then be used to make decisions by the higher-level aspects of the processing algorithm, such as, but not limited to, object detection, object identification, tracking, segmentation, etc.

Since the signal s is typically transmitted from one end of the implementation system (such as cameras) to another end (such as central server), the size of the signal is important constraint in the system design in terms of the storage and bandwidth limitations. It would be beneficial to compress the signal or find the smaller transformation of it. Such transformed signal t, would ideally be smaller than s and in addition, when processed by the kernels K, it would give the same result r.

The optimal candidate for the transformed signal t is the one which is equivalent to s in terms of kernel transformation and has the minimum entropy. Minimum entropy is desirable in that the compression of such signal results in the smallest bitstream. For discrete signal samples, under most common conditions, the minimal entropy representation can be considered equivalent to the minimum variance representation which has a mathematical, closed form solution.

Given a set of kernels, represented as a matrix K, and an input signal sample represented as a vector s, the resultant r of the linear operation of K on s can be obtained through a system:

$$Ks = r. \tag{1}$$

The present methods can be implemented in cases when K and either one of the s or r are known. This involves looking for the transformed vector t, that is equivalent to s, in terms of the kernel operation, such that:

$$Kt = r. \tag{2}$$

In addition to the equivalency requirement, an additional constraint of finding the solution t with the minimal entropy is present. For discrete signal samples, the minimal entropy solution can be considered equivalent to the minimum variance solution, which has a closed form solution of the linear system (2), given by:

$$t = K^T(KK^T)^{-1}(r - Ku\alpha) + u\alpha, \tag{3}$$

where, $u=(1, 1, \ldots, 1)^T$, is a unitary constant column vector, and a is given by:

$$\alpha = \frac{u^T K^T (KK^T)^{-1} r}{u^T K^T (KK^T)^{-1} Ku}.$$

If Ku=0, minimum variance solution is same as a simpler minimum norm solution which is:

$$t = K^T(KK^T)^{-1} r \tag{4}$$

where $K^T$ is the transpose of the matrix K. In cases when $KK^T$ is not invertible, a Moore-Penrose pseudoinverse can be used to obtain solution t. In the case when only a single kernel k is used, the solution is of the form t=r/k.

Using this method of finding t for a given signal s, we obtain a representation of the input signal which can be compressed to a smaller size than s, resulting in smaller bitstream and lowered cost of storing and transmitting but is otherwise equivalent for the machine application.

This technique can be implemented as a part of an encoder 105 in a system that is used for transmitting the signal samples to the decoder 110. It can also be implemented as a pre-processor for some existing encoders, especially encoders that rely on statistical coding and information-theoretic techniques. Such an encoder would generally need fewer bits for the transformed signal sample which has lower entropy than the original signal sample. Examples of such encoders are lossless and lossy image encoders supported by the format families as JPEG, PNG and BMP, and video encoders such as AVC, HEVC, VVC, AV1 and the like.

Figure 2:
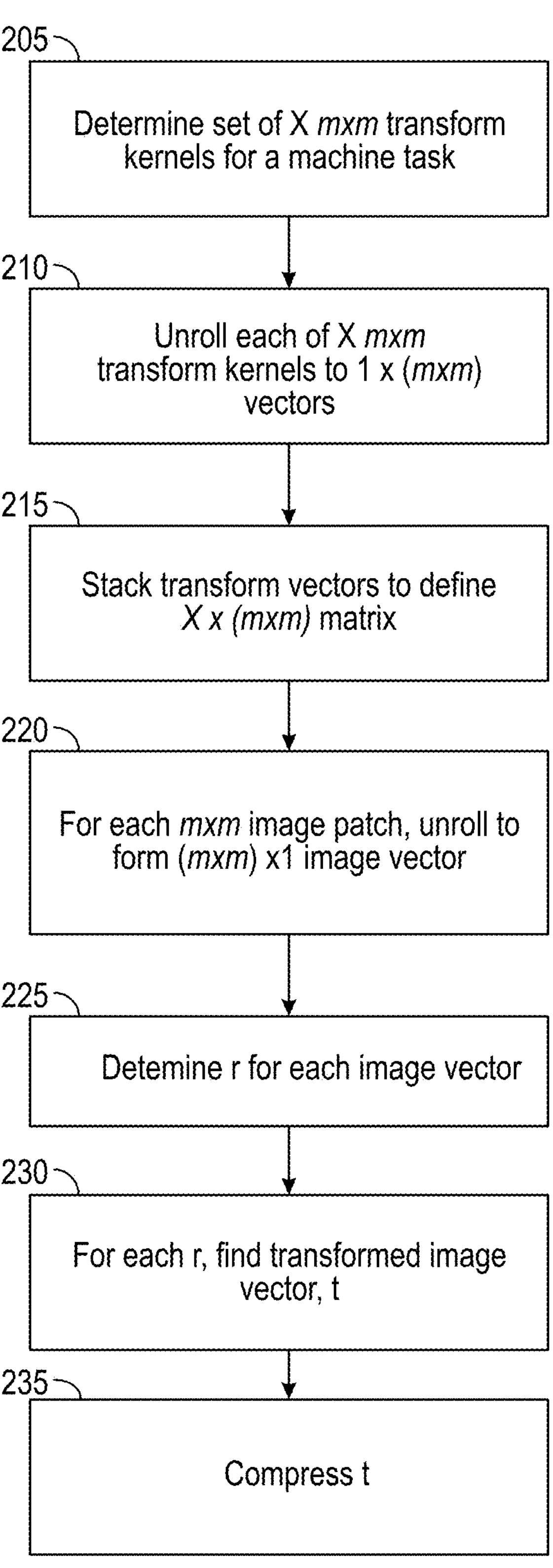
FIG. 2 is a flow chart illustrating a method of entropy minimizing signal compression.
Figures 3A, 3B, 4A, 4B, 4C, 4D:
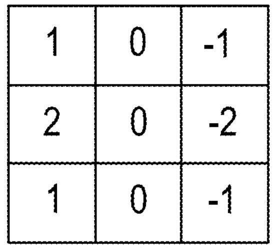
FIGS. 3A and 3B are diagrams illustrating exemplary Sobel 3×3 kernel matrices.
FIGS. 4A, 4B, 4C and 4D are diagrams illustrating exemplary 3×3 convolution kernel matrices.

FIG. 2 is a flowchart illustrating the present methods of minimized entropy encoding. For example, in step 205 the transformer 120 can obtain an appropriate set of transform kernels for a machine task from the machine model 150. This could include, for example, the set of two 3×3 Sobel X and Y kernels illustrated in FIGS. 3A and 3B or the set of four 3×3 convolution kernels in FIGS. 4A-D. Although the kernels in FIGS. 3 and 4 are depicted as 3×3 kernels, this is merely illustrative and other m×m kernel sizes may be applied as appropriate for the machine task.

Figures 5A, 5B, 5C:
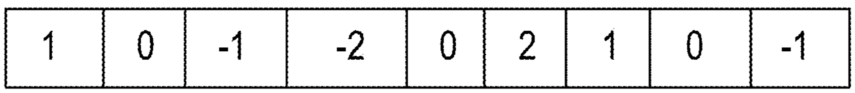
FIGS. 5A-C illustrate the unrolling and stacking of the two 3×3 Sobel kernels of FIG. 3.

As illustrated in FIGS. 5A-C, to obtain kernel matrices (K) for the set of two Sobel kernels in FIG. 3, each of the 3×3 kernels are "unrolled" into 1×9 (1 row, 9 columns) vectors in step 210. These unrolled vectors (FIG. 5A, 5B) are stacked into an X×(m×m) matrix (FIG. 5C) in step 215, which yields a 2×9 matrix for the 3×3 Sobel operators in FIG. 3, as illustrated in FIG. 5C. In this example, the 3×3 matrices were "unrolled" by starting at the top left and moving across and down in a zig-zag pattern. The specific method of unrolling the matrix, however, is not critical. It will be appreciated that a similar process can be used in the case of the set of convolution kernels, as shown in FIG. 4, which would yield a 9×4 matrix for the convolutional kernels.

The size of the kernels may vary based on a specific application or machine task but the image will be parsed and processed in patches which correspond to the kernel size. For example, in the case of the Sobel kernels of FIG. 3, the image will be processed in 3×3 patches. In a similar manner that the kernels were "unrolled," each 3×3 patch of the input picture is "unrolled" into a 9×1 (9 rows, one column) vector of pixel values(s) in step 220. FIG. 7 illustrates an example where the image patch of FIG. 6A is "unrolled." The transformer 120 determines a resultant r from the kernel matrix and unrolled image patches by applying equation (1), Ks=r, in step 225.

To determine the minimized-entropy transformed sample of the image, the transformed image, t, is obtained using equation (4) above (step 230). The transformer 120 will pass the transformed image data t to the compressor 125 and muxer 130 (step 235).

Example

As an example, the present methods are applied to a well-known and often used test picture known as "cameraman," that is transformed based on two sets of kernels. Reproduction of the original image is presented in FIG. 8A.

Two use cases are considered. A first use case involves a machine that uses computer vision algorithm for the edge detection in the picture. It implements a Sobel operator for edge detection and orientation statistics. In this example, the Sobel operator is implemented as two kernels, one for the horizontal x-direction orientation, and one for the vertical y-direction orientation. Those kernels are depicted in FIGS.

3A and 3B. The kernels in this example are 3×3 matrices that are convolved with the original image to produce edge maps that can be binarized and used for edge detection.

The second exemplary use case involves a machine that uses Convolutional Neural Network to process the input picture and complete a task such as object detection, classification, segmentation, tracking, or similar. Typically, the high-level task is not relevant since the transformation technique considers convolution kernels of the first layer of CNN, and is agnostic to the higher-level processing. As an example of the typical convolutional kernels [4], kernels depicted in FIG. 4 can be used.

The present methods are not limited to a particular number of kernels used, kernel size, or the type of kernels. The exemplary use of well-known and frequently used kernels in FIGS. 3 and 4 is only intended to illustrate the utility of the present methods and not be limiting.

As described above, to obtain kernel matrices (K), the kernels are "unrolled" into 1×9 vectors and stacked into a 2×9 matrix for Sobel operator and a 4×9 matrix for the example of four 3×3 convolutional kernels. Then each 3×3 patch of the input picture is "unrolled" into a 9×1 vector of pixel values(s). The resultant r is obtained using equation (1), and the minimized-entropy transformed sample t is obtained using equation (4). The transformed sample t is then compressed and sent over a channel to the decoder 110 where it is decompressed and provided to the machine.

An example of the input 3×3 patch, and the transformed samples for Sobel and convolutional kernels is depicted in FIG. 6A-C.

Even before calculating the entropy for the given example, it can be observed that the structure and repeatability of the values in the transformed samples are more ordered than in the original sample. For the machine in the first use case, applying the Sobel operators on the original 3×3 sample results in the same values as when the Sobel operators are applied to the transformed sample. This is also the case for the convolutional sample.

To summarize-a picture sample (in this case 3×3 patch), when convolved with the 3×3 kernel gives a single value (from equation 1). Inverse matrix multiplication is used to find another 3×3 patch that has minimal entropy (variance) that will give that same value when convolved with that kernel (using equations 2-4). Instead of compressing/sending the original 3×3 pixel patch, the patch of lower entropy is compressed/sent. The machine takes that patch and convolves it with the 3×3 kernel, obtaining identical value as if it used the original patch.

Figure 8A:
FIGS. 8A-8C illustrate a test image and resulting images following Sobel and convolution transformations, respectively.
Figure 8A:
Figure 8B:
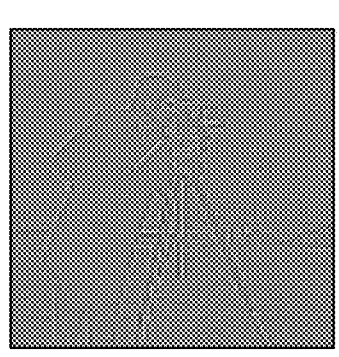
Figure 8C:

When the processing of all patches in the picture is completed, the resulting transformed pictures look as presented in FIG. 8A-8C which illustrates the original test picture (FIG. 8A), the picture transformed for the Sobel kernels (FIG. 8B) and the picture transformed for the convolutional kernels (FIG. 8C). The picture in FIG. 8A is suitable for a human observer. The picture in FIG. 8B is equivalent to the original picture for a machine that uses Sobel operators/kernels, e.g., those two pictures are indistinguishable and identical to such a machine. The same is true for the picture in FIG. 8C. in the case of a machine that uses convolution kernels.

Figure 9A:
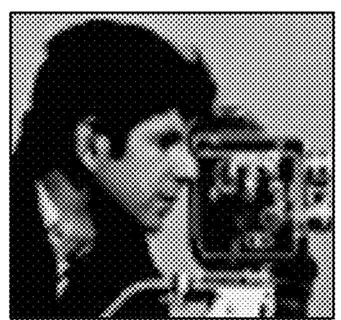
FIGS. 9A-9C are enlarged portions of the images in FIG. 8A-C, respectively.
Figure 9B:
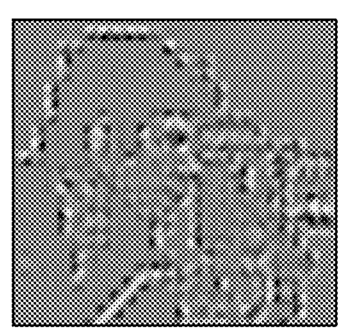
Figure 9C:

To emphasize the visual differences, zoomed-in portions of the images in FIG. 8A-C are shown in FIG. 9A-C, respectively.

To illustrate the efficacy of the present methods, the entropy of the original and transformed images can be calculated as an average entropy of the 3×3 patches.

The resulting entropy is shown in the following table:

| | Original picture | Sobel transformed | Conv transformed |
|---|---|---|---|
| Average entropy | 2.42 | 1.28 | 1.42 |

Figure 10A:
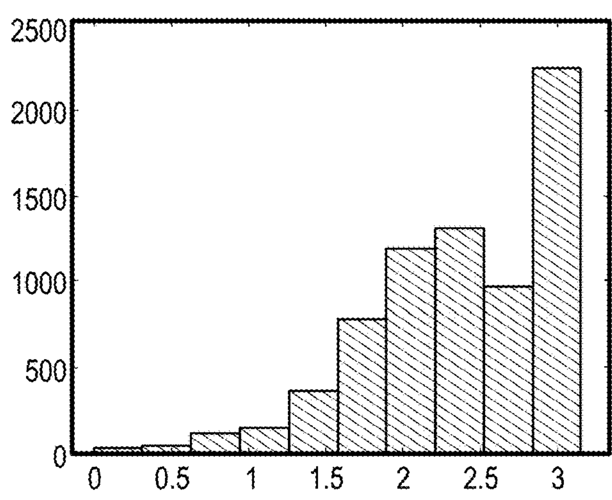
FIGS. 10A-10C are graphs illustrating histograms of sample entropies in an original image, the image processed with Sobel transform, and the image processed with convolution transform.
Figure 10B:
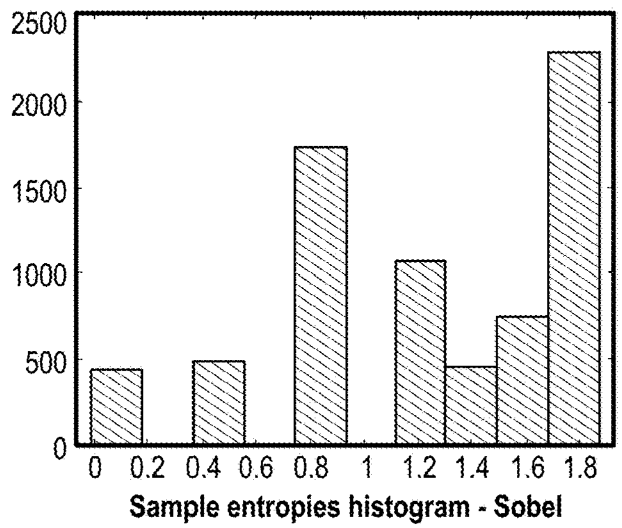
Figure 10C:
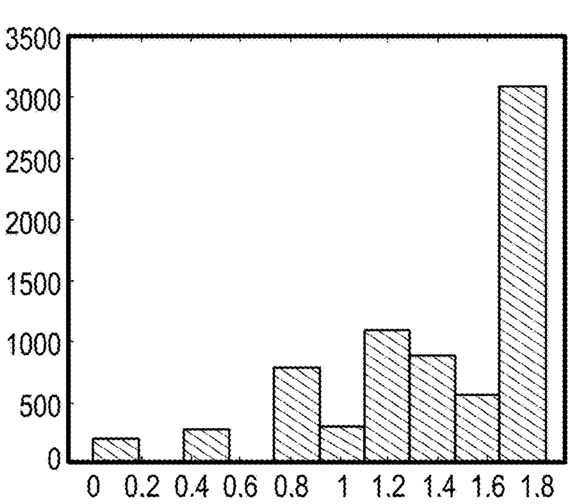

By using the methods disclosed herein, the signal sample entropy is reduced by almost 50% for the Sobel operators/kernels and by over 40% for the convolution kernels. The histograms of the entropy values of all 3×3 patches/samples are presented in FIG. 10. In general, the lower entropy values suggest that similar coding savings should be expected when statistical and information-theoretic techniques are used to compress the signal samples.

To give a simple illustration, the test picture was loselessly encoded using a Compressor with Huffman coding. Huffman coding is used in its original form or some derivative in most of the popular coding algorithms, including image and video coding.

The efficacy of the proposed technique is illustrated using the average length of the binary codewords used to encode picture samples. This number represents average number of bits needed to encode the compressed signal. Results are presented in the following table:

| | Original | Sobel | Convolution |
|---|---|---|---|
| Average Huffman codeword length | 22.27 | 12.37 | 13.61 |

The results demonstrate that by using the proposed techniques, encoder could save 45% and 39% respectively, for Sobel and convolutional samples.

Methods have been presented for transforming the signal from the original, input, samples into entropy-minimized samples that are equivalent under the kernel operators. It is demonstrated that the proposed technique results in significant savings in terms of entropy and coding gains. The methods disclosed herein can be implemented as a novel coding technique or as a pre-processor for existing coding techniques, with expected savings in both use cases that result in higher compression of the transmitted signals.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which can be special or general purpose, coupled to receive data and instructions from, and to transmit data and instructions to, a storage system, at least one input device, and at least one output device.

Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

It is to be noted that any one or more of the aspects and embodiments described herein may be conveniently implemented using one or more machines (e.g., one or more decoder and/or encoders that are utilized as a user decoder and/or encoder for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

The foregoing provides a detailed description of illustrative embodiments of the invention. It will be appreciated by persons of skill in the art that various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein.

Accordingly, this description is meant to be taken only by way of example, and not to otherwise limit the scope of this invention.

In the descriptions above, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the disclosure.

What is claimed is:

1. An encoder for signal coding with entropy-minimizing kernel-based transformation comprising:

a transformer module, the transformer module applying a set of transform kernels for a machine task and determining a transformed equivalent of the input signal featuring reduced entropy, wherein the transform kernels are m×m matrices and wherein the process of determining a transformed equivalent of the input signal further comprises:

unrolling each m×m transform matrix into a one-dimensional vector;

stacking the transform vectors into a single transform matrix;

partitioning the input signal into m×m signal patches;
unrolling each m×m signal patch into a one-dimensional signal vector;
using the transform matrix, determine a resultant vector, r, for each signal vector; and
for each resultant vector, determine the transformed signal as $t=K^T(KK^T)^{-1}r$ where $K^T$ is the transpose of the transform matrix; and a compressor module receiving the transformed signal and compressing the transformed signal to generate a compressed bitstream for transmission on a communication channel.

2. The encoder of claim 1, wherein the input signal is a video signal.

3. The encoder of claim 2, wherein the transform kernels are Sobel kernels.

4. The encoder of claim 2, wherein the transform kernels are convolution kernels.

5. The encoder of claim 2, further comprising a machine model coupled to the transformer module and wherein the transform kernels are determined at least in part based on the machine model.

6. The encoder of claim 2, wherein the transformed signal is compressed by the compressor using a compression standard selected from the group including VVC, HEVC, and AV1.

7. The encoder of claim 2 wherein the transformed signal is compressed by the compressor using a compression standard optimized for video coding for machines.

8. The encoder of claim 1, wherein the input signal is a video signal.

9. The encoder of claim 8, wherein the transform kernels are Sobel kernels.

10. The encoder of claim 8, wherein the transform kernels are convolution kernels.

11. The encoder of claim 8, further comprising a machine model coupled to the transformer module and wherein the transform kernels are determined at least in part based on the machine model.

12. A method for an encoder to encode a signal with reduced entropy comprising:

using a transformer module of the encoder, applying a set of X transform kernels, the kernels each in the form of an m×m transform matrix;
unrolling each m×m transform matrix into a one-dimensional 1×(m×m) transform vector;
stacking the transform vectors into an X×(m×m) transform matrix;
partitioning the input signal into m×m signal patches, and for each signal patch:
unrolling each m×m signal patch into a one-dimensional signal vector;
using the transform matrix, determine a resultant vector, r, for each signal vector; and
for each resultant vector, determine the transformed signal as $t=K^T(KK^T)^{-1}r$ where $K^T$ is the transpose of the transform matrix; and
using a compressor module of the encoder, compressing the transformed signal to form a compressed bitstream.

13. An encoder for input picture signal coding with entropy-minimizing kernel-based transformation comprising:

a transformer module, the transformer module applying a set of transform kernels and determining a transformed equivalent of the input signal featuring reduced entropy; and
a compressor module receiving the transformed signal and compressing the transformed signal to generate a compressed bitstream for transmission on a communication channel, wherein the transform kernels are m×m matrices, and wherein the process of determining a transformed equivalent of the input signal further comprises:
unrolling each m×m transform matrix into a one-dimensional vector;
stacking the transform vectors into a single transform matrix;
partitioning the input signal into m×m signal patches;
unrolling each m×m signal patch into a one-dimensional signal vector;
using the transform matrix, determine a resultant vector, r, for each signal vector; and
for each resultant vector, determine the transformed signal as $t=K^T(KK^T)-1r$ where $K^T$ is the transpose of the transform matrix.

* * * * *